(12) United States Patent
Smart

(10) Patent No.: US 11,639,700 B2
(45) Date of Patent: May 2, 2023

(54) AIRFRAME INTEGRATED SCRAMJET WITH FIXED GEOMETRY AND SHAPE TRANSITION FOR HYPERSONIC OPERATION OVER A LARGE MACH NUMBER RANGE

(71) Applicant: Hypersonix IP Holdings, Inc., Columbia, MD (US)

(72) Inventor: Michael Kevin Smart, Brisbane (AU)

(73) Assignee: Hypersonix IP Holdings, Inc., Columbia, MD (US)

( * ) Notice: Subject to any disclaimer, the term of this patent is extended or adjusted under 35 U.S.C. 154(b) by 117 days.

(21) Appl. No.: 17/014,884

(22) Filed: Sep. 8, 2020

(65) Prior Publication Data
US 2022/0074369 A1 Mar. 10, 2022

(51) Int. Cl.
| | | |
|---|---|---|
| *F02K 7/10* | (2006.01) | |
| *F02C 7/04* | (2006.01) | |
| *F02C 7/228* | (2006.01) | |
| *B64D 33/02* | (2006.01) | |

(52) U.S. Cl.
CPC ............. *F02K 7/10* (2013.01); *F02C 7/04* (2013.01); *F02C 7/228* (2013.01); *B64D 2033/026* (2013.01); *F05D 2220/10* (2013.01)

(58) Field of Classification Search
CPC .............. F02K 7/10–14; B64D 2033/026
See application file for complete search history.

(56) References Cited

U.S. PATENT DOCUMENTS

| | | | | |
|---|---|---|---|---|
| 3,807,170 | A * | 4/1974 | Kesting | F02K 7/18 60/768 |
| 4,194,519 | A * | 3/1980 | Baker | F02C 7/04 60/768 |
| 5,224,344 | A * | 7/1993 | Keirsey | F02K 7/18 60/769 |
| 5,253,474 | A * | 10/1993 | Correa | F02K 7/10 60/768 |
| 8,256,706 | B1 | 9/2012 | Smith et al. | |

(Continued)

FOREIGN PATENT DOCUMENTS

AU 2020100803 A4 * 6/2020

OTHER PUBLICATIONS

Supersonic Combustion Ramjet Missile, Fredericks. Billig, Journal of Propulsion and Power, vol. 11, No. 6, Nov.-Dec. 1995, p. 1144. (Year: 1995).*

(Continued)

*Primary Examiner* — Todd E Manahan
*Assistant Examiner* — Marc J Amar
(74) *Attorney, Agent, or Firm* — Stoel Rives LLP

(57) ABSTRACT

Airframe integrated scramjet engines are disclosed. Scramjet engines within the scope of this disclosure may be configured to integrate smoothly with an airframe of a hypersonic flight aircraft or vehicle. The scramjet engine may include capture shape of an inlet configured to capture airflow, a combustor configured for combustion of fuel and air, and an exit shape of a nozzle configured for expansion of the combusted fuel and air to provide hypersonic thrust. In some embodiments, the scramjet engine has a fixed geometry and a transitioning cross-sectional shape over its full length. The scramjet engine is configured to be a component of launch vehicle system.

20 Claims, 6 Drawing Sheets

(56) References Cited

U.S. PATENT DOCUMENTS

| | | | | |
|---|---|---|---|---|
| RE43,731 | E * | 10/2012 | Bulman | F02K 7/10 60/225 |
| 10,495,027 | B1 * | 12/2019 | Hodge | F02K 9/50 |
| 2007/0187550 | A1 * | 8/2007 | Elvin | B64C 30/00 244/36 |
| 2019/0345895 | A1 * | 11/2019 | Rathay | F02K 7/10 |
| 2020/0002020 | A1 * | 1/2020 | O'Brien | B64D 33/02 |
| 2020/0240362 | A1 | 1/2020 | You et al. | |

OTHER PUBLICATIONS

"Comparison of Planar and Axisymmetric Flowpaths for Hydrogen Fueled Space Access Vehicles (Invited)", Frederick S. Billig and Lance S. Jacobsen, American Institute of Aeronautics and Astronautics, 39th AIAA/ASME/SAE/ASEE Joint Propulsion Conference and Exhibit, Jul. 20-23, 2003, p. 5. (Year: 2003).*

"Scramjet Inlets", Michael K. Smart, Centre for Hypersonics the University of Queensland Brisbane 4072 Australia, Sep. 2010, pp. 9-2 and 9-3. (Year: 2010).*

James Turner and Michael Smart, "Application of Inlet Injection to a Three-Dimensional Scramjet at Mach 8", Apr. 2010, AIAA Journal, vol. 48, No. 4, pp. 829-838. (Year: 2010).*

Thomas Jazra, Dawid Preller, and Michael K. Smart, "Design of an Airbreathing Second Stage for a Rocket-Scramjet-Rocket Launch Vehicle", Mar.-Apr. 2013, Journal of Spacecraft and Rockets, vol. 50, No. 2, pp. 411-422. (Year: 2013).*

Luke Doherty, Michael Smart, and David Mee, "Experimental Testing of an Airframe-Integrated Three-Dimensional Scramjet at Mach 10", Nov. 2015, AIAA Journal, vol. 53, No. 11, pp. 3196-3207. (Year: 2015).*

Giuseppe Pezzella, Hypersonic Vehicles—Past, Present and Future Developments, Oct. 2, 2019, IntechOpen Limited, pages of chapters 3 and 5. (Year: 2019).*

Suraweera, Milinda V., and Michael K. Smart. "Shock-tunnel experiments with a Mach 12 rectangular-to-elliptical shape-transition scramjet at offdesign conditions." Journal of Propulsion and Power 25, No. 3 (2009): 555-564. (Year: 2009).*

Chan, et al., "Freejet Testing of the HIFiRE 7 Scramjet Flowpath at Mach 7.5", Journal of Propulsion and Power, vol. 34, No. 4, Jul.-Aug. 2018, 10 pages.

Smart, M. K. et al., "Design of Three-Dimensional Hypersonic Inlets with Rectangular-to-Elliptical Shape Transition", Journal of Propulsion and Power, vol. 15, No. 3, May-Jun. 1999, 10 pages.

Smart, M. K. et al., "Experimental Testing of a Hypersonic Inlet with Rectangular-to-Elliptical Shape Transition", Journal of Propulsion and Power, vol. 17, No. 2, Mar.-Apr. 2001, 8 pages.

Whitside, et al., "Low Mach Number Testing of a Scramjet for Access to Space", AIAA 2020-2435, Session: Hypersonics 2020 Conference Proceedings, Published Online Apr. 1, 2020, 10 pages.

Yokev, et al., "Impact of Fuel Injection Distribution on Flame Holding in a Cavity-Stabilized Scramjet", Journal of Propulson and Power, vol. 37, No. 4, Jul. 2021, published online Jan. 29, 2021 at https://arc.aiaa.org/doi/10.2514/1.B38093, abstract only, 1 page.

U.S. Patent and Trademark Office, International Search Report and Written Opinion of the International Searching Authority for PCT/US2020/049750, dated Jun. 11, 2021, 9 pages.

* cited by examiner

AIRFRAME INTEGRATED SCRAMJET WITH FIXED GEOMETRY AND SHAPE TRANSITION FOR HYPERSONIC OPERATION OVER A LARGE MACH NUMBER RANGE

TECHNICAL FIELD

The disclosure relates to hypersonic airbreathing propulsion systems. More particularly, the disclosure relates to supersonic combustion ramjet (scramjet) engines. In some embodiments, the disclosure relates to airframe integrated scramjet engines.

BRIEF DESCRIPTION OF DRAWINGS

So that the manner in which the features and advantages of the invention can be understood in more detail, description of the invention briefly summarized above may be had by reference to the illustrations in the appended drawings. It is noted, however, that the drawings illustrate only an embodiment of the invention and therefore are not to be considered limiting of its scope, as the invention may admit to other equally effective embodiments.

DETAILED DESCRIPTION

Figure 1:
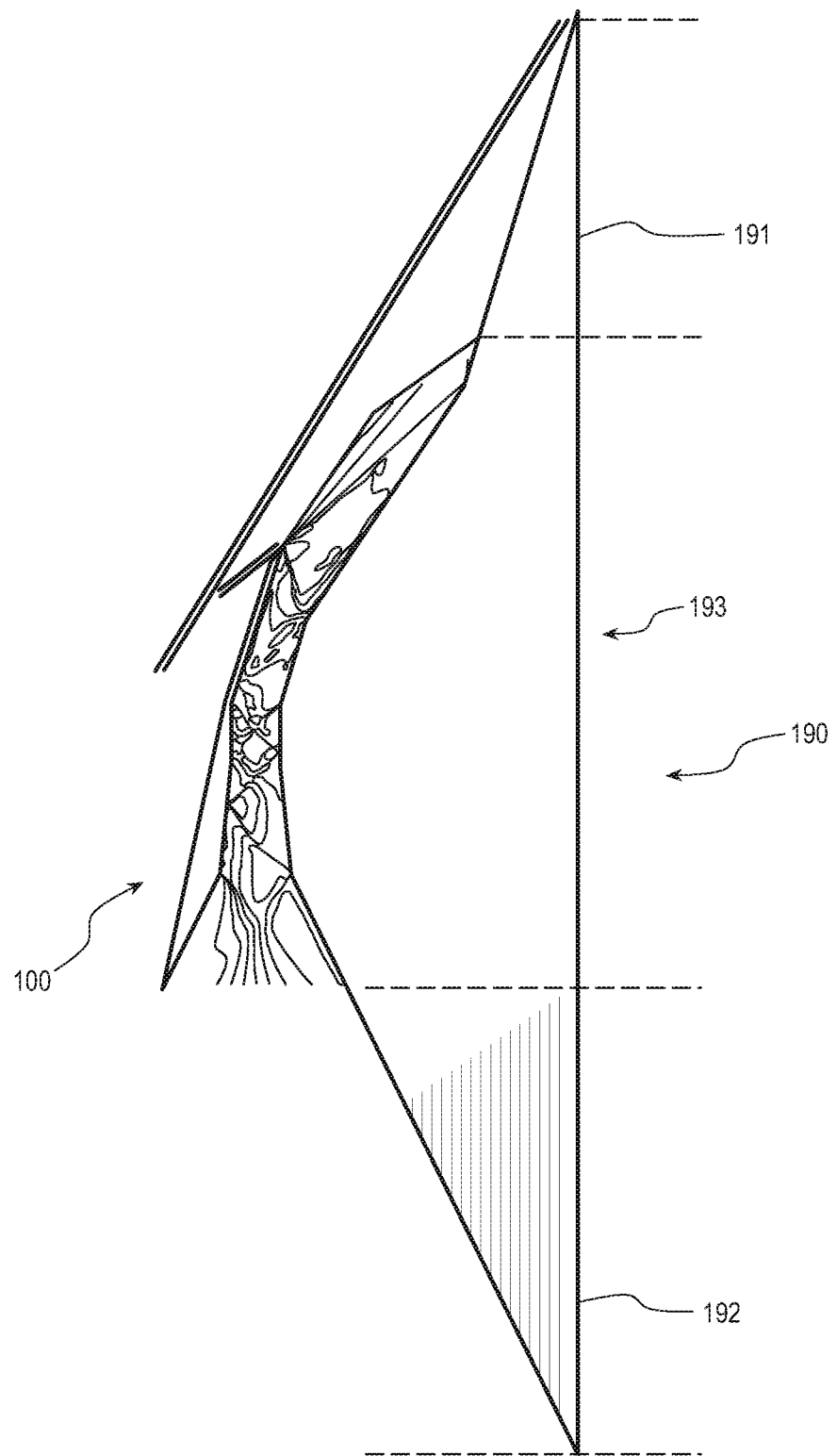
FIG. 1 is a cross-sectional schematic of a portion of an airframe of a hypersonic flight vehicle that includes an embodiment of an airframe integrated scramjet engine.

A scramjet is an airbreathing engine for hypersonic flight. It can be an alternative propulsion system to rockets for space launch and long-distance, high-speed flight. Hypersonic is defined as travel at speeds greater than or equal to Mach 5, with Mach 1 being the speed of sound in air at sea level. In certain embodiments, the scramjet engine may include an inlet, a combustor, and a nozzle. The inlet may be configured to capture airflow and compress it to conditions suitable for combustion of fuel with oxygen in the air. Air entering the combustor from the inlet can be burned with fuel while maintaining a supersonic velocity. The air and combustion products then pass into the nozzle where they are expanded and accelerated before leaving the scramjet engine to provide the hypersonic engine thrust. The scramjet engine is intended to generate a forward thrust force to power a hypersonic flight aircraft or vehicle while it is flying in the atmosphere at a hypersonic speed. If a scramjet engine is able to generate a forward thrust force at a particular flight Mach number it is considered to be operational at that flight Mach number.

In some embodiments a scramjet engine can be integrated smoothly into a hypersonic flight aircraft or vehicle airframe that it is designed to power at hypersonic speed. Furthermore, the scramjet engine may involve a transition in cross-sectional shape along its length such that the conflicting requirements of airframe integration and robust combustion can be satisfied. Additionally, the scramjet engine can be configured to generate a thrust force in the direction of motion over a large Mach number range with a fixed geometry. In other words, the scramjet engine may enable acceleration of the hypersonic flight aircraft or vehicle over a large hypersonic Mach number range without changing its shape. The ability to generate a thrust force in the direction of motion over a large hypersonic Mach range means that the scramjet engine is configured to accelerate the hypersonic aircraft or vehicle and can be used as part of a space launch system.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

The directional terms "fore" and "aft" are given their ordinary meaning in the art. That is, "fore" refers to a forward or leading portion of a hypersonic flight aircraft or vehicle airframe and "aft" refers to a rearward or trailing portion of a hypersonic flight aircraft or vehicle airframe.

FIGS. 1-6 illustrate different views of airframe integrated scramjet engine embodiments and related components. In certain views each engine may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIG. 1 shows a schematic cross-section of a portion of a hypersonic flight aircraft comprising a vehicle airframe 190 which includes an airframe-integrated scramjet engine 100 according to the present disclosure. The vehicle airframe 190 is made up of the vehicle forebody 191, an intermediate portion of the airframe 193 and the vehicle aftbody 192. The disclosed scramjet engine 100 is one that is attached to the vehicle airframe 190 such that the vehicle forebody 191 compresses air captured by the scramjet engine 100, and the vehicle aftbody 192 continues to expand exhaust from the scramjet engine 100 after it leaves the scramjet engine 100.

The disclosed scramjet engine 100 may be smoothly integrated into the vehicle airframe 190. This means that the scramjet engine 100 is attached to the vehicle airframe 190 such that air flowing along the vehicle forebody 191 passes smoothly into and around the scramjet engine 100 with minimal disruption or turbulence and/or that exhaust from the scramjet engine 100 flows smoothly onto and over the vehicle aftbody 192.

Figure 2:
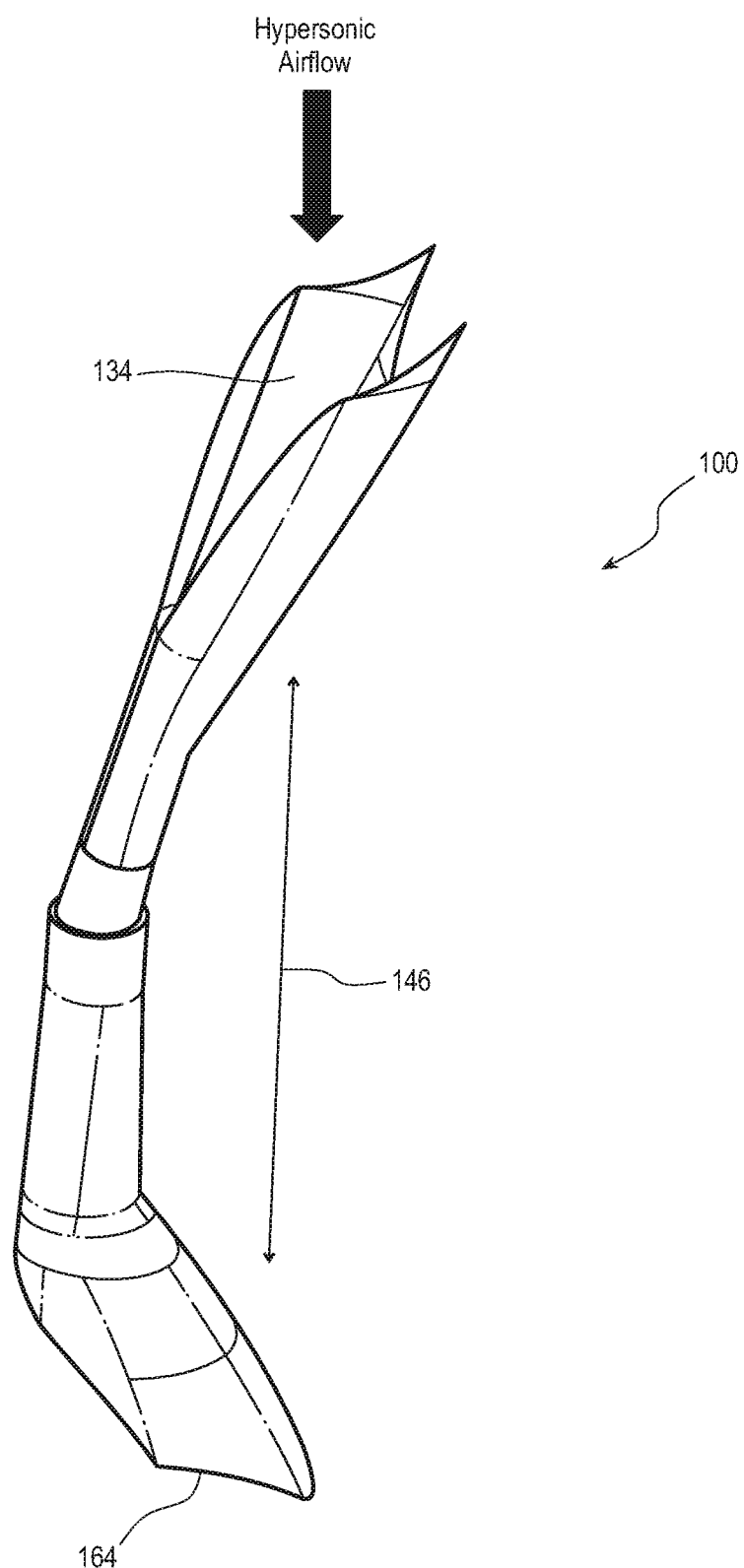
FIG. 2 is an isometric view an embodiment of the scramjet engine of FIG. 1.

FIG. 2 illustrates a capture shape 134, shape transition 146, and exit shape 164 of a disclosed scramjet engine 100. As shown in FIG. 2, the disclosed scramjet engine 100 comprises a capture shape 134 that can be integrated smoothly with the forebody 191 of the hypersonic flight aircraft or vehicle airframe 190, a contracting and expanding shape transition 146 over its length, and an exit shape 164 that can be integrated smoothly with the aftbody 192 of the hypersonic flight aircraft or vehicle airframe 190. The shape transition 146 is a feature of the disclosed scramjet engine 100 that enables both the capture shape 134 and the exit shape 164 to be independently specified to meet geometric requirements of integrating smoothly with a range of different hypersonic flight aircraft or vehicle airframes 190. Another feature of the shape transition 146 is that it enables an internal shape of the disclosed scramjet engine 100 to be configured for the generation of robust combustion and a thrust force in the direction of motion over a large Mach range.

An operational Mach range of a scramjet engine is the range of Mach number over which the scramjet engine generates a thrust force in the direction of motion. The minimum Mach number at which the disclosed scramjet engine 100 is operational is Mach 5. A large operational Mach range for a scramjet is considered to be an increase in Mach number of 3. The disclosed scramjet engine 100 has a minimum operational range from Mach 5 to Mach 8, so it can be considered to have a large operational Mach range. In some embodiments the disclosed scramjet engine 100 may have an operational Mach range from Mach 5 to Mach 12.

The disclosed scramjet engine 100 shown in FIG. 2 can be integrated smoothly with the airframe 190 at the capture shape 134 and the exit shape 162 in order to generate a net thrust. If this is not the case, the thrust force generated by the scramjet engine 100 can be negated by external drag generated by the aerodynamic interaction between the hypersonic flight aircraft or vehicle airframe 190 and the scramjet engine 100. In other embodiments, variations of the shape transition 146 may allow the scramjet engine 100 to be installed on differently shaped hypersonic flight aircraft or vehicles airframes 190.

The capture shape 134 of the disclosed scramjet 100 is configured to capture a high proportion of available airflow at the upper Mach number of the disclosed scramjet engine's 100 operational range, but spill air at lower Mach numbers within its operational Mach range.

The disclosed scramjet engine 100 may be used to power a hypersonic flight aircraft or vehicle 190 during hypersonic flight. For example, the scramjet engine 100 may power a hypersonic flight aircraft or vehicle airframe 190 at hypersonic speeds within its operational Mach range without a change in geometry during hypersonic flight.

Figure 3:
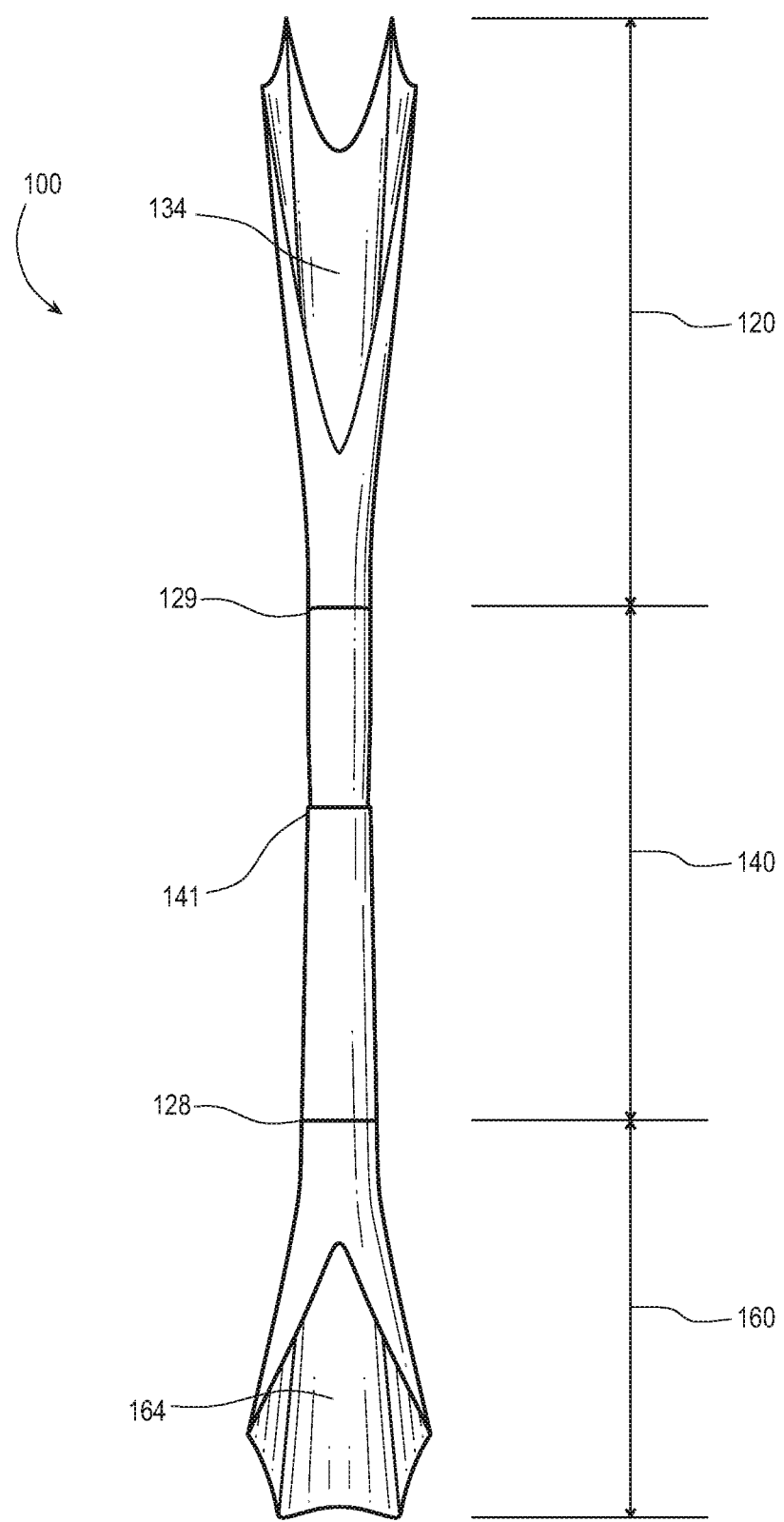
FIG. 3 is a bottom view of the scramjet engine of FIG. 1.

FIG. 3 illustrates an embodiment of the scramjet engine 100 according to the present disclosure. As shown, the disclosed scramjet engine 100 can comprise three general components. These components are (1) an inlet 120, which is configured to capture hypersonic airflow and compress and heat the airflow to conditions suitable for combustion of fuel through the action of shock waves and airflow dilation; (2) a combustor 140, where fuel and air are burned so as to add energy to the airflow passing through the scramjet engine 100; and (3) a nozzle 160, where combustion products (e.g., water and carbon dioxide) and any unburned air or fuel are expanded to generate a thrust force. The inlet 120 comprises a surface that extends from the capture shape 134 to a throat 129 of the disclosed scramjet engine 100. The combustor comprises a surface that extends from the throat 129 to a nozzle entrance 128. The nozzle 160 comprises a surface that extends from the nozzle entrance 128 to the exit shape 164 of the disclosed scramjet engine 100.

Figure 4:
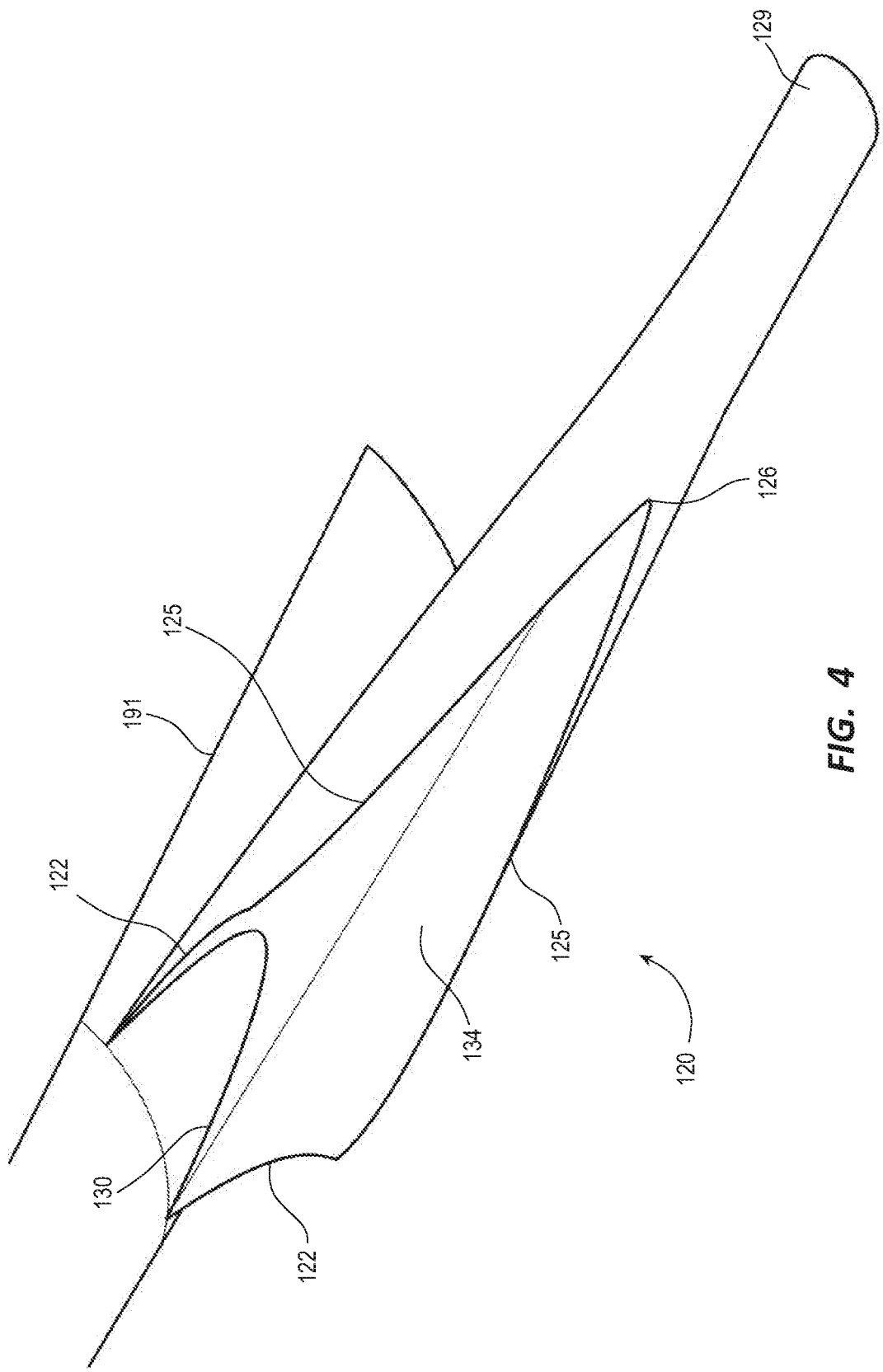
FIG. 4 is an isometric view of an embodiment of an inlet of the scramjet engine of FIG. 1.

FIG. 4 depicts an embodiment of the inlet 120 of the scramjet engine 100 according to the present disclosure. The capture shape 134 of the inlet 120 can be configured to be smoothly integrated with the forebody 191 of the hypersonic flight aircraft or vehicle airframe 190. In other embodiments, the capture shape 134 of the inlet 120 can be adjusted to facilitate smooth integration with any suitable hypersonic flight aircraft or vehicle airframe, including winged hypersonic aircraft or hypersonic missiles. For example, the forebody 191 can include a convex shape, a concave shape, a planar shape, etc.

The capture shape 134 of the inlet 120 is a closed shape that comprises a bodyside leading edge 130, a pair of side leading edges 122, and a pair of cowl leading edges 125. The bodyside leading edge 130 is attached directly to the forebody 191 along its entire length. The pair of side leading edges 122 are attached to each end of the bodyside leading edge 130 and are projected aft and away from the forebody 191 at an angle less than 90 degrees to the forebody 191. The pair of cowl leading edges 125 are attached to aft ends of the side leading edges 122 and are disposed between the side leading edges 122 to join at a cowling notch 126. The cowling notch 126 may be configured to allow excess airflow to be spilled from the inlet 120 as further described below.

The inlet 120 may be a mixed contraction inlet. The capture shape 134 of the inlet 120 is configured to provide external and internal air compression or contraction, that enables the scramjet engine 100 to be self-starting over its operational Mach range. Self-starting means that supersonic airflow will be established through the scramjet engine 100 at applicable hypersonic flight Mach numbers. If supersonic flow is not established, then the scramjet engine 100 cannot produce a thrust force in the direction of motion at hypersonic flight conditions. The inlet 120 is configured to provide the required amount of airflow compression to make possible robust combustion of fuel and air in the combustor 140.

The throat 129 of the disclosed scramjet 100 can be disposed aft of the cowling notch 126. The throat 129 can have a cross-sectional area that is smaller than the capture shape 134. The throat 129 can be in communication with the inlet 120 and the combustor 140 such that air collected by the inlet 120 flows from the inlet 120 through the throat 129 and into the combustor 140. The throat 129 can have a rounded shape. For example, the rounded shape may be elliptical, circular, oval, or any other suitable shape that does not contain any sharp corners.

Figure 5:
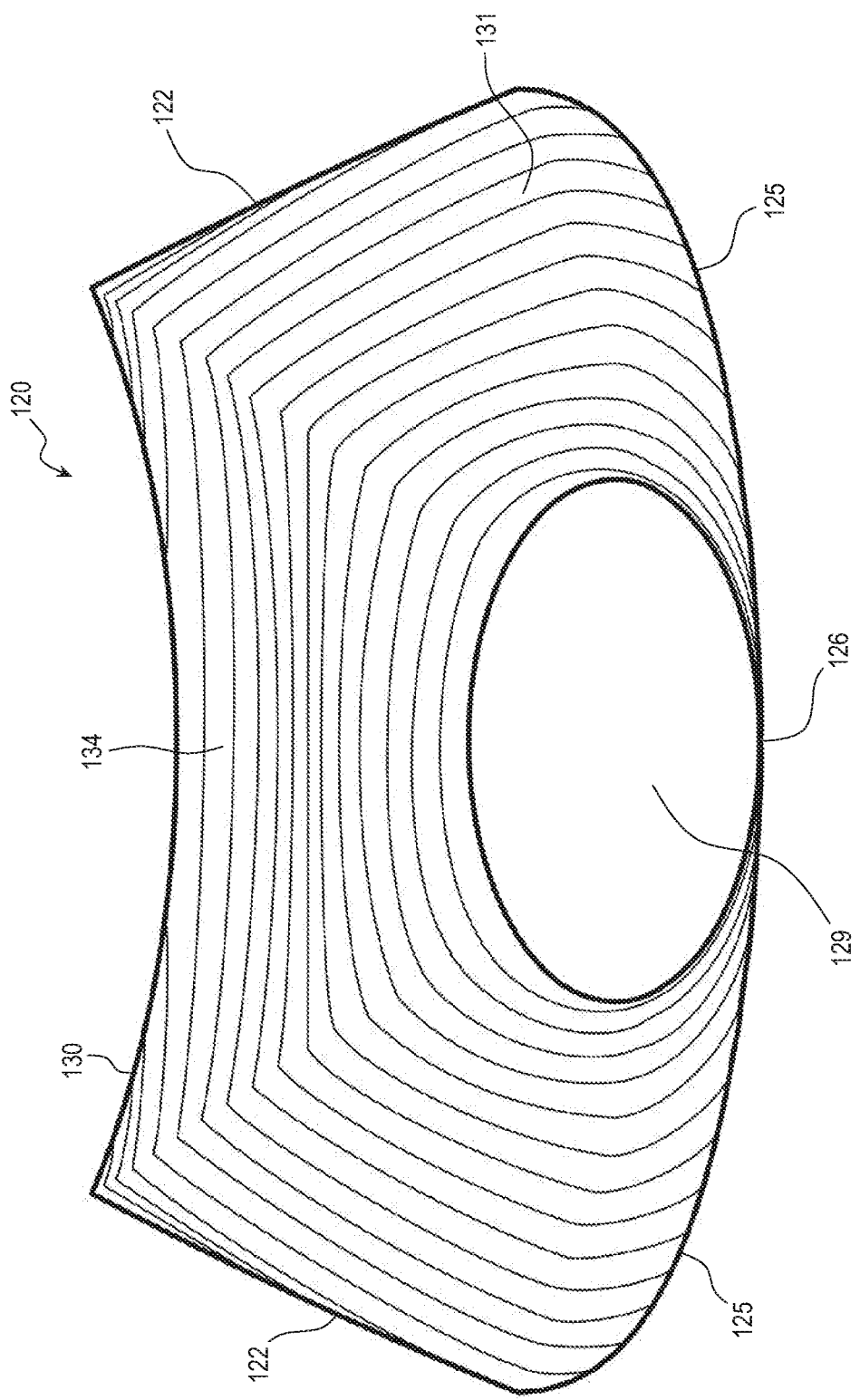
FIG. 5 is a front view of the embodiment of the inlet of FIG. 4.

FIG. 5 illustrates a view of the inlet 120 according to the present disclosure looking downstream. FIG. 5 depicts the inlet 120 having a smooth shape transition from the capture shape 134 to the rounded throat 129. The smooth shape transition is depicted as imposed contour lines 131 that are substantially evenly spaced from the capture shape 134 to the rounded throat 129. The smooth shape transition of the inlet 120 can lead to low internal drag and therefore the opportunity for greater overall thrust from the disclosed scramjet engine 100.

As shown in FIG. 3, the rounded throat 129 connects directly to an entrance of the combustor 140. The shape and cross-sectional area of the rounded throat 129 are the same as the combustor entrance. The cross-sectional area of the combustor 140 may increase along its length from the combustor entrance to a combustor exit. The combustor 140 has a rounded cross-section without sharp corners along its full length. The combustor 140, having a rounded cross-section, is superior to a combustor 140 having a cross-section that includes corners (e.g., square, rectangular, etc.) in terms of a lower structural weight required to contain a specified pressure, and a smaller surface area over which the airflow passes needed to enclose a specified flow area. Fluid dynamic problems associated with hypersonic corner flows are also not present with the rounded cross-section of the combustor 140

The area and cross-sectional shape of the combustor 140 are varied along its length such that fuel can be burned efficiently over the operational Mach number range of the scramjet engine 100, without any adjustment to its physical shape. This is accomplished by including multiple fuel injectors in the engine and making use of different combinations of the fuel injectors and the metering level of fuel from each fuel injector.

As illustrated in FIG. 3, the combustor 140 includes a single backward facing step 141 around the circumference of its rounded cross-sectional area.

Figure 6:
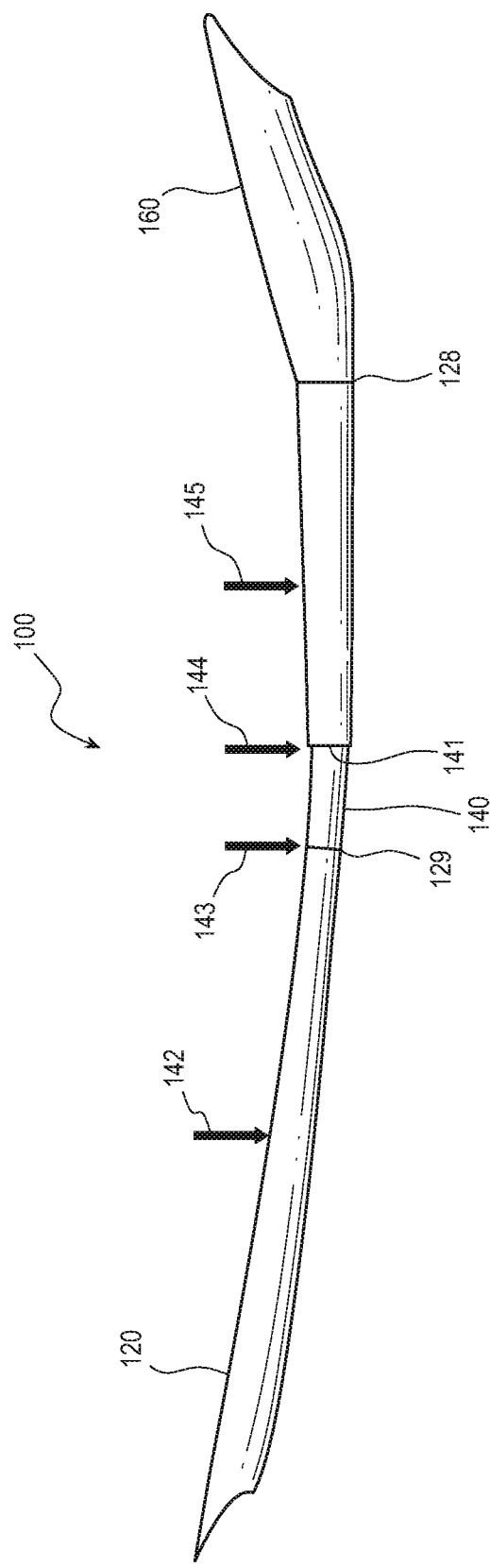
FIG. 6 is a side view of the scramjet engine of FIG. 1 depicting locations of fuel injection stations.

FIG. 6 shows a side view of the scramjet engine 100 according to the present disclosure, indicating possible locations of four fuel injection stations 142, 143, 144, 145 along the length of the scramjet engine 100. As depicted in FIG. 6, the fuel injection stations 142, 143, 144, 145 can be located:

on the bodyside 133 of the inlet 120 (station 1 142);
upstream of the backward facing step 141 (station 2 143);
adjacent the backward facing step 141 (station 3 144); and
downstream of the backward facing step (station 4 145).

The pressure, temperature and velocity of air entering the disclosed scramjet engine 100 changes as it accelerates from Mach 5 to higher Mach numbers. This means that shock waves and other features of the hypersonic airflow within the scramjet engine 100 will also change. The disclosed scramjet engine 100 has a fixed geometry, so there is no movement of the shape or geometry of the scramjet engine 100 over its full length during hypersonic flight. To have a large operational Mach number range, fuel injection stations 142, 143, 144, 145 may be used, individually or in different combinations, and at different fuel metering levels, to maximize the combustion efficiency of the disclosed scramjet engine 100 with a goal of burning more than 80% of the oxygen in the air that is captured by the disclosed scramjet engine 100.

The use of the fuel injection stations 142, 143, 144, 145, individually or in combination, and at different fuel metering levels, varies depending on the flight Mach number. For example, at the upper portion of the operational Mach range, where mixing between fuel and air is the greatest challenge, fuel is injected at station 1 142 on the bodyside 133 of the inlet 120 at metering levels of up to 50% of a total fuel metering level in order to take advantage of the inlet length to increase mixing between fuel and air; the remaining fuel would be injected at stations 2 and 3 upstream 143, 144 and adjacent to the backward facing step 141. At the intermediate portion of the operational Mach range, fuel is injected at stations 2 and 3 143, 144 upstream and adjacent to the backward facing step 141 only, at metering levels ranging between 40% and 60% of the total fuel metering from each station. At the lower portion of the operational Mach range, injection of fuel upstream of the backward facing step 141 can create a large pressure rise in the disclosed scramjet engine 100 that could lead to an engine unstart. Fuel is therefore injected at stations 2 and 3 143, 144 upstream of the backward facing step 141 at a combined metering level of less than 70%, with up to 30% injected at station 4 145 downstream of the backward facing step 141.

FIG. 3 depicts one embodiment of the nozzle 160 of the scramjet engine 100 according to the present disclosure. As depicted, the nozzle 160 extends aft from the combustor 140. The nozzle 160 includes an expanding shape transition from the rounded cross-sectional shape of the combustor 140, to an exit shape 164 that integrates smoothly with the hypersonic flight aircraft or vehicle airframe 190 (not shown in FIG. 3). The nozzle 160 has a smoothly varying cross-sectional shape that expands in area along its length and is ended at the exit shape 164. The exit shape 164 can be adjusted to meet the requirement of being smoothly integrated with the hypersonic flight aircraft or vehicle airframe 190. Other embodiments of the nozzle 160 with different exit shapes 164 allow smooth airframe integration on hypersonic flight aircraft or vehicles that have curved or other aft body shapes.

While the invention has been shown or described in some of its forms, it should be understood that the invention is not intended to be limited to the particular forms disclosed. Rather, the invention is to cover all modifications, equivalents, and alternatives falling within the spirit and scope of the invention as defined by the following claims.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A scramjet engine, comprising:
   an inlet, the inlet including a capture shape defined by: (a) a bodyside leading edge that is shaped to be smoothly integrated with a forebody of an airframe of a hypersonic vehicle, (b) a pair of side leading edges projecting aft from the bodyside leading edge and away from the airframe, and (c) a pair of cowl leading edges projecting from aft ends of the side leading edges, the cowl leading edges joining aft of the side leading edges to form a cowling notch;
   a combustor, the combustor disposed aft of the inlet;
   a nozzle disposed aft of the combustor, the nozzle having an exit shape that is configured to be smoothly integrated with an aft body of the airframe; and
   multiple fuel injectors spaced apart along the scramjet engine, the fuel injectors including a first fuel injection station including a first fuel injector disposed on a bodyside of the inlet in proximity to the cowling notch, a second fuel injection station including a second fuel injector disposed aft of the first fuel injector and the cowling notch and forward of the combustor, and a third fuel injection station including a third fuel injector disposed in the combustor aft of the second fuel injector, wherein at least one of the first, second, and third fuel injectors injects fuel into the scramjet engine at a rate that is varied with changes in a flight Mach number of the hypersonic vehicle so as to maintain combustion throughout an operational Mach range of the scramjet engine including at all flight Mach numbers between Mach 5 and Mach 8;
   wherein the geometry of the scramjet engine is fixed along a full length of the scramjet engine, and the scramjet engine is self-starting at flight Mach numbers at least as low as Mach 5.

2. The scramjet engine of claim 1, wherein the side leading edges are projected aft from the bodyside leading edge at an angle less than 90 degrees to the forebody of the airframe.

3. The scramjet engine of claim 1, wherein the inlet comprises a smooth, contracting surface extending from the capture shape to a rounded inlet throat;
   wherein a cross-sectional area of the throat is smaller than a cross-sectional area of the capture shape; and
   wherein the inlet is configured to capture and compress an airflow as the airflow flows from the capture shape to the rounded inlet throat.

4. The scramjet engine of claim 3, wherein an upstream end of the combustor connects directly to the rounded inlet throat.

5. The scramjet engine of claim 1, wherein the cowling notch is configured to allow spillage of the airflow from the inlet when the flight Mach number is Mach 5 or greater.

6. The scramjet engine of claim 1, wherein the inlet is a mixed contraction inlet.

7. The scramjet engine of claim 1, wherein all of the airflow captured by the inlet passes through the combustor.

8. The scramjet engine of claim 1, wherein the combustor comprises a rounded cross-sectional area along its full length, and wherein the cross-sectional area increases along the length of the combustor from an upstream end to a downstream end.

9. The scramjet engine of claim 8, wherein the combustor further comprises a backward facing step around the circumference of the rounded cross-sectional area.

10. The scramjet engine of claim 9, wherein:
    the second fuel injection station is disposed upstream of the backward facing step; and
    the third fuel injection station is disposed adjacent to the backward facing step; and further comprising
    a fourth fuel injection station disposed downstream of the backward facing step.

11. The scramjet engine of claim 10, wherein the first fuel injection station does not inject fuel during a first portion of the operational Mach range, and the fourth fuel injection station does not inject fuel during a second portion of the operational Mach range.

12. The scramjet engine of claim 10, wherein, when the scramjet engine is operating near the bottom of its operational Mach range, up to 30% of the fuel injected into the scramjet engine is delivered through the fourth fuel injection station.

13. The scramjet engine of claim 10, wherein, when the scramjet engine is operating near the bottom of its operational Mach range, approximately 30% of the fuel injected into the scramjet engine is delivered through the fourth fuel injection station.

14. The scramjet engine of claim 1, wherein the upstream end of the nozzle connects directly to a rounded downstream end of the combustor.

15. The scramjet engine of claim 1, wherein all of the air, fuel and combustion products exiting the combustor pass through the nozzle.

16. The scramjet engine of claim 15, wherein the nozzle comprises a smooth, expanding surface extending from the rounded upstream end to the exit shape;
    wherein a cross-sectional area of the upstream end is smaller than a cross-sectional area of the exit shape; and
    wherein the nozzle is configured to expand the air, fuel and combustion products passing through the nozzle from the rounded upstream end to the exit shape.

17. The scramjet engine of claim 1, wherein at least one of the fuel injectors does not inject fuel during a portion of the operational Mach range.

18. The scramjet engine of claim 1, wherein the operational Mach range includes all flight Mach numbers from Mach 5 to Mach 12.

19. The scramjet engine of claim 1, wherein, when the scramjet engine is operating near the top of its operational Mach range, up to 50% of the fuel injected into the scramjet engine is delivered through the first fuel injection station.

20. The scramjet engine of claim 1, wherein, when the scramjet engine is operating near the top of its operational Mach range, approximately 50% of the fuel injected into the scramjet engine is delivered through the first fuel injection station.

\* \* \* \* \*